United States Patent Office 3,261,656
Patented July 19, 1966

3,261,656
ISOCYANATE OR ISOTHIOCYANATE TERMINATED POLYOXYALKYLENE ETHERS OF A POLYOL TREATMENT OF CRUSTED LEATHER GRAIN SIDES AND THE PRODUCT THEREOF
Maynard B. Neher, Columbus, and Victor G. Vely, Hilliard, Ohio, assignors, by mesne assignments, to Titekote Corporation, Wilmington, Del., a corporation of Delaware
No Drawing. Filed Dec. 3, 1962, Ser. No. 241,540
The portion of the term of the patent subsequent to Dec. 4, 1979, has been disclaimed
7 Claims. (Cl. 8—94.21)

This application is a continuation-in-part of our copending application, Serial No. 846,245, filed October 14, 1959, entitled, "Leather Treatment Process and Composition," and now Patent No. 3,066,997 issued December 4, 1962.

This invention relates to a substituted-amine composition used to treat leather to achieve superior properties, a process for treating leather to greatly improve its surface properties, and to the leather product resulting therefrom. More particularly, this invention relates to the treatment of leather, which has previously been processed to the crusted state, with a substituted-amine composition that is the product of the reaction of a diisocyanate or diisothiocyanate with a polyfunctional alcohol.

Reaction products of polyfunctional alcohols or amines and diisocyanates have been developed and used commercially as surface coatings for materials as varied as steel, wood, concrete, and leather. In many of these existing formulations and applications, polyfunctional materials such as trimethylol propane, castor oil, or hydroxyl-terminated polyesters are reacted with a diisocyanate, then mixed with a curing agent and applied to the material to provide a continuous film or coating. Such coatings do not impregnate leather but, rather, are applied over the surface of leather to form a surface coating. These polyurethane coatings of the prior art are intended to act as a physical protection of the leather surface. They are designed in such a manner that impregnation of the leather normally does not occur to any significant extent and thus they do not chemically react with, or modify, the surface of the leather. Further, if the surface of the crusted leather is deliberately impregnated with these polyurethane materials prior to their formation as a continuous film or coating, the leather becomes inflexible, exhibits surface cracking when folded, and shows significant decrease in many physical properties.

It is an object of this invention to provide a process for treating leather that will substantially enhance the surface properties of the leather.

It is another object of this invention to provide a new leather-treating composition comprising a modified isocyanate.

It is also an object of this invention to provide a new leather-treating compositon comprising a modified isothiocyanate.

It is a further object of this invention to provide a new leather product that is significantly more scuff- and abrasion-resistant, without detriment to the other physical properties commonly attributed to leather.

Still another object of this invention is to produce a treated leather that essentially remains soft and does not become inflexible.

The above objects and other objects and advantages, which will be apparent from the description which follows, are achieved by treating leather, which has been previously processed to the crusted state, with a substituted amine. The substituted amines of interest are modified diisocyanates and diisothiocyanates. While the leather must have been processed through the crusted state for this treatment to be effective, most leather that has already received a base or pigment coat is not amenable to this treatment, because the base or pigment coat prevents the modified isocyanate or isothiocyanate composition from penetrating into the leather. Any other coating that may be applied to leather during its treatment, which will not prevent the penetration of the modified isocyanate or isothiocyanate composition of this process into the leather, will not interfere with the practice of this procedure and the beneficial results obtained therefrom.

To form the composition which is used to treat the leather, a diisocyanate or diisothiocyanate or mixture thereof is reacted with a polyfunctional alcohol (also known as a polyol), of a molecular weight in the range of from about 1,800 to 20,000 to form the useful substituted-amine product. There should be about two isocyanate or isothiocyanate groups present for each hydroxyl group present to prepare the product. To achieve the best results, a slight excess of diisocyanate or diisothiocyanate should be used over the amount calculated as the 2:1 equivalent so as to compensate for water that may be present in the polyfunctional alcohol and in the reaction solvent employed. The condensation product formed contains at least three free isocyanate or isothiocyanate groups and is of a molecular weight in the range of from about 2,300 to 20,500.

The linkage formed through the reaction of an hydroxyl group with an isocyanate group is a carbamate. A carbamate group or linkage may be depicted as follows:

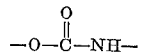

The reaction of a hydroxyl group with an isothiocyanate group yields a thiocarbamate group:

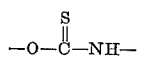

Thus, the condensation products resulting from reaction of the hydroxyl groups of the polyfunctional alcohol with a diisocyanate, or diisothiocyanate, contain one bound isocyanate group (carbamate group) and one free isocyanate group (—NCO), or one bound isothiocyanate group (thiocarbamate group) and one free isothiocyanate group (—NCS), for each hydroxyl group reacted with the diisocyanate, or diisothiocyanate, respectively.

As illustrative of the formation of the composition which is used to treat the leather, a polyoxyalkylenated-polyol of a molecular weight in the range of 1,800 to 20,000 is reacted with an organic diisocyanate, or an organic diisothiocyanate, or a mixture thereof in the ratio of about one mole of the same for each hydroxyl of the polyoxyalkynated-polyol. To achieve the best results, a slight excess, usually about 5 percent by weight, of the organic diisocyanate or organic diisothiocyanate is used. The condensation product which forms from reaction of the polyoxyalkenylenated polyol and the diisocyanate or diisothiocyanate contains one bound isocyanate group (carbamate) or one bound isothiocyanate group (thiocarbamate) and one free isocyanate group (—NCO) or one free isothiocyanate group (—NCS) for each hydroxyl of the polyglycol reacted with the diisocyanate or diisothiocyanate.

In a more specific illustration of formation of a composition, which is used to treat the leather, where the polyfunctional alcohol is a polyoxyethylenated glycerol, the reaction with a diisocyanate compound may be illustrated as follows:

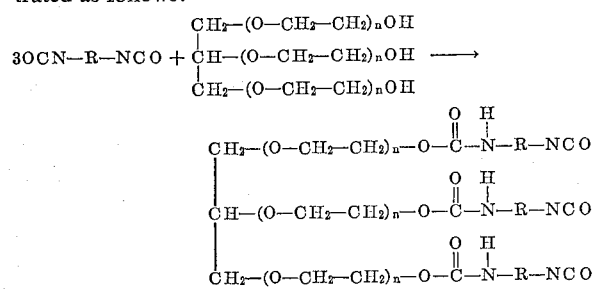

where in the above formula $n$ denotes an integer value sufficient to provide the polyoxyethylenated glycerol of a molecular weight of about 5000, and R denotes a divalent organic radical selected from the group consisting of alkylene, arylene, and alkarylene radicals.

The following formula is illustrative of the product that may be formed where the employed reactants, the diisocyanate and the polyfunctional alcohol, are defined generically:

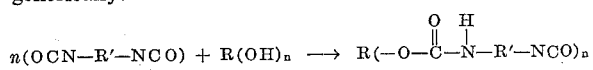

where $n$ is an integer of at least three; R' is a divalent organic radical selected from the group consisting of alkylene, arylene, and alkarylene radicals; and R is a polyvalent organic radical selected from the group consisting of polyvalent hydrocarbon radicals containing ether linkages; and $n$, R', and R are such that the substituted-amine product

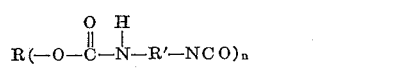

is of a molecular weight in the range of 2,300 to 20,500. As a general rule, the polyvalent organic radical, R, is of a molecular weight in the range of about 1,800 to 20,000. By hydrocarbon radicals containing ether linkages, it is intended to include only those radical structures consisting of carbon, hydrogen, and oxygen atoms with all oxygen atoms present in the radical structures being present as ether linkages.

The reaction products obtained when a diisothiocyanate is used as a reactant in place of the diisocyanate will be identical to the formulations illustrated above, except that in all cases the oxygen of the isocyanate radical will be replaced by a sulfur atom. The linkage formed through the reaction of a hydroxyl group with an isothiocyanate is a thiocarbamate.

The products described above are illustrative of the modified isocyanate and isothiocyanate compositions that are of great value in treating leather. In preparing these compositions, among the organic compounds, both aromatic and aliphatic diisocyanates and diisothiocyanates may be used as reactants. The aliphatic diisocyanates, however, are more toxic and for this reason are not preferred.

Among those organic diisocyanates and diisothiocyanates that may be used, the following are illustrative of those containing an aliphatic nucleus:

Hexamethylene diisocyanate
Ethylene diisocyanate
Trimethylene diisocyanate
Decamethylene diisocyanate
Tetramethylene diisocyanate
Propylene diisocyanate
Butylene-1,2-diisocyanate
Butylene-2, 3-diisocyanate
Decamethylene diisothiocyanate
Propylene diisothiocyanate
Butylene-1,3-diisothiocyanate The following are illustrative of organic diisocyanates, and diisothiocyanates, which contain an aromatic nucleus, that may be used as reactants:

2,4-tolylene diisocyanate
2,6-tolylene diisocyanate
3,3'-bitolylene 4,4'-diisocyanate
Diphenyl methane 4,4'-diisocyanate
3,3'-dimethyl diphenyl methane 4,4'-diisocyanate
m-Phenylene diisocyanate
p-Phenylene diisocyanate
o-Phenylene diisocyanate
p-Phenylene diisothiocyanate
2,4-tolylene diisothiocyanate
2,6-tolylene diisothiocyanate The polyfunctional alcohol or polyol reacted with the diisocyanate or diisothiocyanate may be a linear polyether structure having at least three hydroxyl groups separated by a repeating ether linkage such as ethylene oxide, propylene oxide, or butylene oxide. These are known as polyoxyethylene, polyoxypropylene, and polyoxybutylene polyols. Examples of useful reactants are: polyoxyethylene polyols having a molecular weight ranging from about 1,800 to about 20,000; polyoxypropylene polyols having a molecular weight ranging from about 1,800 to about 20,000; and polyoxybutylene polyols having a molecular weight ranging from about 1,800 to about 20,000. Moreover, either mixtures of different molecular weights of one type of polyether polyol or mixtures of different polyether polyols can be employed as reactants so as to produce a particular product.

Other suitable polyfunctional hydroxy-terminated compounds that can be reacted with a diisocyanate or diisothiocyanate are hydrocarbon derivatives, such as aliphatic polyols having a molecular weight ranging from about 1,800 to about 20,000.

The following are illustrative of some additional polyfunctional alcohols that may be employed as reactants to prepare the modified isocyanate or isothiocyanate compositions:

(1) Castor oil, castor oil modified with polyols, and trihydroxy polyoxypropylenes having three linear chains and three hydroxyl groups with either glycerine, trimethylol propane, or hexane as the nucleus of the molecule;

(2) Tetrahydroxy compounds such as those prepared by the addition of alkylene oxides, such as propylene or ethylene oxides to erythritol, other tetrahydroxy alcohols, and the like;

(3) Hexahydroxy compounds, such as those prepared by reacting propylene oxide with sorbitol to obtain chains of polyoxypropylene, each chain terminated with a hydroxyl group;

All of these above-listed illustrative polyfunctional alcohols being limited for employment as reactants to those having at least three hydroxyl groups and a molecular weight in the range of from about 1,800 to 20,000.

In forming the composition which is used to treat the leather, there may be employed as one reactant a polyoxalkylenated polyol of a molecular weight in the range of about 1,800 to 20,000. A polyoxyalkylenated polyol consists essentially of a polyether modification of the polyol structure by having terminal hydroxyl groups connected to a polyvalent organic radical structure through essentially linear repeating ether linkages, such as repeated oxyethylene, oxypropylene, or oxybutylene radicals. A number of such materials are immediately commercially available and other polyoxyalkylenated polyols are known to the art and/or are readily prepared by methods well known to the art by a polyalkyloxation of the polyol. Illustrative of the preparation of a polyoxylalkylenated polyol is the reacting of ethylene oxide with glycerol in the presence of a catalyst until there is introduced into the glycerol structure an amount of oxyethylene linkages providing a polyoxyethylanated glycerol of a desired molecular weight. Since most polyoxyalkylenated polyols are prepared by such methods, it is usual in defining such materials to describe the same by the average number of moles (not necessarily a whole number) of repeated oxyalkylene linkages introduced into the polyol without indicating whether equal amounts of the connecting ether linkages are introduced for each hydroxyl group. Illustrative of polyols useful for preparing polyoxyalkylenated polyols are trihydroxy, tetrahydroxy, pentahydroxy, hexahydroxy, etc., organic alcohols, such as glycerol; beta-methyl glycerol; trimethylolpropane; erythritol; pentaerythritol; arabitol; isosorbide; sorbitol; mannitol; and the like. Illustrative of alkylene oxides used to convert such triols, etc., to polyoxyalkylenated triols, etc., of the aforementioned requisite molecular weight are: ethylene oxide, propylene oxide; butylene oxide; and the like, with sufficient amounts of the alkalene oxides employed to provide a polyoxyalkylenated polyol of the aforestated requisite molecular weight.

The nature of the useful substituted-amine product is determined greatly by the nature of the particular reactants employed to form the product. The molecular size of the product is determined greatly by the molecular weights of the particular polyfunctional alcohol and particular diisocyanate or diisothiocyanate reactants and the amounts thereof which are reacted. The reactants, of course, are of those molecular weights that provide a substituted-amine product of a molecular weight in the range of about 2,300 to 20,500. Thus, as the number of hydroxyl groups in the polyfunctional alcohol is increased or as the molecular weight of the polyfunctional alcohol is increased, the molecular weight of the particularly employed diisocyanate or diisothiocyanate should be such as to still provide a product within the aforestated molecular weight range. The amount or ratio of the diisocyanate or diisothiocyanate to the polyfunctional alcohol also should closely approximate, or at least not exceed by a substantial amount, about two isocyanate or isothiocyanate groups in the reactants for each hydroxyl group present in the polyfunctional alcohol. In the absence of such control in the preparation of the modified isocyanate or isothiocyanate composition, the leather is adversely affected by the composition, as indicated by grain cracking when the leather is folded. The higher molecular weight products generally do not exhibit the beneficial effects on the surface properties of leather treated with them that the products of a molecular weight within the range disclosed herein achieve. It has also been observed that the application to leather, even in small amounts, of simple organic diisocyanates, such as tolylene diisocyanate, causes severe grain damage. To avoid this undesirable effect in preparing the modified isocyanate and isothiocyanate compositions described herein, such amounts of diisocyanate or diisothiocyanate and polyfunctional alcohol or amine are employed in the formation of the reaction products so as to prevent damage to the leather by any residual unreacted diisocyanate or diisothiocyanate. It is necessary to add an additional amount of diisocyanate or diisothiocyanate which is equivalent to the water in the di- and polyfunctional alcohol or amine and solvent components in order to obtain the desired yield of product. The reaction is allowed to proceed until the monomeric diisocyanate or diisothiocyanate is reacted to the extent that only trace amounts of this material are left in the final product. These trace quantities have little or no influence on the performance of the modified isocyanate or isothiocyanate product as a leather-treating chemical.

The useful substituted-amine products, which contain at least three free isocyanate or isothiocyanate groups and are of a molecular weight in the range of from about 2,300 to 20,500, also may contain up to about 20 percent by weight of certain reaction products, which contain only two free isocyanate or isothiocyanate groups and are of a molecular weight between about 2,300 and 20,500. Such reaction products are formed from reaction of a difunctional alcohol, amine, or amino alcohol with a diisocyanate or diisothiocyanate in the ratio of reactants of about two free isocyanate or isothiocyanate groups for each hydroxyl group, and preparation of the same are described in greater detail in the aforementioned patent. These reaction products having only two free isocyanate or isothiocyanate groups are helpful to stabilize the useful substituted-amine product having at least three free isocyanate or isothiocyanate groups, and in amounts up to about 20 percent by weight are not detrimental for treatment of the leather. Somewhat larger amounts of such difunctional reaction products in the useful substituted-amine composition can cause grain damage and hardening of the treated leather.

In general, isocyanates or isothiocyanates react with any substance containing active hydrogens, whereas they react only very slowly with the active hydrogen of carbamate or thiocarbamate groups. As the size of the molecule increases, the reaction rate of the isocyanate or isothiocyanate group with the active hydrogen of the carbamate or thiocarbamate group decreases even further. To further minimize the amount of interaction between isocyanate or isothiocyanate groups and active hydrogen, and thus to increase the stability during storage of the leather-treating compositions described herein, small amounts of organic chlorides containing a hydrolyzable chlorine atom are employed. These organic chlorides contain one or more hydrolyzable chlorine atoms per molecule. These chlorides may be added to the reaction mixture in which the carbamate or thiocarbamate products are formed. Only a relatively small amount of the organic chloride need be added to the reaction mixture to obtain the desired effect. Some of the organic chlorides that can be used effectively for this purpose are orthochlorobenzoyl chloride and 2,4-dichlorobenzoyl chloride.

While the reaction to form the modified isocyanate or isothiocyanate composition does not require the presence of a mutual solvent or a diluent, some reaction mixtures are more easily handled when a solvent-diluent is present. In the absence of such a diluent-solvent, the reaction mixture becomes quite viscous. There are many solvents that may be used. A basic requirement for the solvent is that it not interact with any of the reactants and that it not contain water to any appreciable extent. Preferably, the solvent should be free from water since additional diisocyanate or diisothiocyanate reactant must be added to compensate for any water in the solvent. Some acetate esters are very satisfactory solvents. Toluene and/or xylene are satisfactory diluents. The diluent-solvent also facilitates the application of the modified isocyanate or isothiocyanate compositions to leather.

The modified isocyanate and isothiocyanate compositions described above are structurally tailored to be effective leather-treating materials at very low levels of treatment, thereby making the process of treating the leather with these materials very economical. Leather, which has been processed through the crusted state, has been treated successfully with a modified isocyanate composition, applying less than one gram of solids per square foot. Such treatment has resulted in as much as 200 to 300 percent improvement in scuff resistance in the subsequently finished leather as determined by the "International Scuff Tester." On some leathers, a greater concentration of the modified isocyanate composition is required to effect the same improvement in wearing qualities. In general, it is advisable to keep the level of treatment of the leather below 10 grams of solids per square foot, since, in addition to the economic reasons, even the highly modified isocyanate or isothiocyanate compounds described herein will cause some grain damage due to excessive cross linking with the leather and leather constituents, such as, some fat liquors and water vapor normally contained within the leather.

In the process of applying the modified isocyanate and isothiocyanate compositions to leather, a diluent-solvent is employed to assist in obtaining the desired degree of penetration of the leather grain. The addition of a diluent-solvent has already been disclosed; it has been indicated that the reaction mixture was more readily handled when a diluent-solvent was present. The same solvent employed as a diluent is also used as the solvent to aid in the application of the compositions to the leather. A solvent mixture may also be used. As indicated above, the only restriction on the use of a solvent is that it not interact with the isocyanate or isothiocyanate groups. An acetate ester alone, or in combination with toluene and/or xylene has proven to be a satisfactory diluent-solvent. Good results have been obtained with leather-treating compositions containing 20 to 50 percent of the substituted-amine product and a balance essentially of diluent-solvent. Other concentrations of the modified isocyanate or isothiocyanate compositions are also possible and may be employed within the limitation of the method of application to the leather.

In the process of applying these compositions to leather, they are applied to the grain side of the leather. There are many acceptable methods of application. Among those methods that have been found acceptable are spraying, brushing, swabbing, and roller deposition. A dipping process, wherein both sides of the leather are treated is undesirable, since it is only necessary and desirable to treat the grain side of the leather. Treating both sides of the leather unduly increases the costs of the operation.

For clarity of understanding, the process disclosed herein for treating leather to achieve substantial improvement in surface properties will be summarized at this point. Leather that has been processed at least to the crusted state can be treated with beneficial results. A substituted-amine composition of a structure containing at least three free isocyanate or isothiocyanate groups, or a mixture of the two, with only one substituted-amine linkage for each free isocyanate or isothiocyanate group, is applied to the grain side of the leather. The substituted-amine composition is embodied in a diluent-solvent which acts as a carrier and diluent. The treating composition is applied in a concentration normally not exceeding 10 grams of solids per square foot of leather. After the composition has been applied, the leather is heated to evaporate the carrier solvent. The leather is ready for further processing after the solvent has been evaporated. However, there is even a further improvement produced in the surface properties of the leather by continuing the heating of the leather after the solvent has been driven off. This further heating continues and accelerates the curing effect which has been initiated by the first application of heat. The leather is now ready for the application of the base or pigment coat, and this step may proceed in the various ways presently employed in the leather industry. Thus, employing this process to improve the surface properties of the leather results in no significant alternation in the techniques or systems presently employed to apply the base or pigment coat, or any of the subsequent finish coats, to the leather.

A new leather product results from the treatment of crusted leather with these compositions in the manner described herein. This new leather product is unique in appearance and in physical characteristics. For example, it exhibits a marked improvement in both leather and finish "break" and in scuff and abrasion resistance.

The following examples are intended to more specifically and clearly illustrate the practice of this invention. All examples are on the basis of parts and percent by weight.

*Example 1*

Under an atmosphere of dry nitrogen and with constant agitation, there are mixed 41 parts of 2,4-tolylene diisocyanate and 0.42 part of dibutyltin dilaurate and then there is slowly added 375 parts of a triol essentially of the following formula:

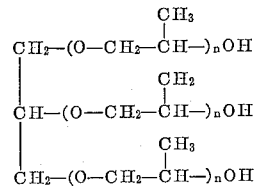

wherein $n$ is about 28 and the triol is of an average molecular weight of about 5,000. The triol may be prepared by a polypropoxylation reaction of glycerol with propylene oxide and also is commercially available. The resulting mixture, while still under an atmosphere of dry nitrogen and with constant agitation thereof, is heated to and held at about 75° C. for about 15 to 30 minutes and then cooled to about 20° C. The resulting product is a very viscous liquid and upon analysis is found to have a free isocyanate content (—NCO) of 2.2 percent (theoretical, 2.3 percent) and is of an average molecular weight approximating 5,500.

About 250 parts of the product are mixed with about 500 parts of ethyl toluene and then 0.25 part of 2,4-dichlorobenzoyl chloride added thereto as a stabilizer to provide a leather treating composition containing about 33 percent of the substituted-amine product.

*Example 2*

Under an atmosphere of dry nitrogen and with constant agitation, there are mixed 27.4 parts of 2,4-tolylene diisocyanate and 0.23 part of dibutyltin dilaurate, and then there is slowly added 201.5 parts of a triol of the same formula as in Example 1, except that $n$ is about 22 and the triol is of an average molecular weight of about 4000. The triol may be prepared by a polypropoxylation reaction of glycerol with propylene oxide and also is commercially available. The resulting mixture, while still under an atmosphere of dry nitrogen and with constant agitation thereof, is heated to and held at 90° C. for about 15 to 20 minutes, and then cooled to about 20° C. The resulting product is a viscous liquid of an average molecular weight of about 4500 and is found, upon analysis, to have a free isocyanate content of 2.6 percent (theoretical, 2.8 percent).

To provide a leather treating composition, the product then is diluted with ethyl toluene to provide a 1:3 solution thereof and about 0.03 percent of 2,4-dichlorobenzoyl chloride added thereto to stabilize the composition until used.

*Example 3*

In substantial accordance with the procedure of Example 1, a triol of the same formula as employed in Example 1, except that $n$ is about 8 and the triol is of an average molecular weight of about 2,000, is reacted with 2,4-tolylene diisocyanate in the ratio of about 3 moles of the diisocyanate to each mole of the triol in the presence of a small amount of an organotin catalyst by heating a mixture thereof to about 80° C. for about 30 minutes while under an atmosphere of dry nitrogen and with constant agitation to yield a substituted-amine product having a free isocyanate content of about 4.9 percent (theoretical, 5.0 percent) and an average molecular weight approximating 2,500.

The product then is diluted with ethyl toluene to provide a leather treating composition containing about 35 percent product.

*Example 4*

In substantial accordance with the procedure of Example 1, a triol of the same formula as employed in Example 1, except that $n$ is about 34 and the triol is of an average molecular weight of about 6,000, is reacted with 2,4-tolylene diisocyanate in the ratio of about 3 moles of the diisocyanate to each mole of the triol in the presence of a small amount of an organotin catalyst by heating a mixture thereof to about 80° C. for about 30 minutes which under an atmosphere of dry nitrogen and with constant agitation to yield a substituted-amine product of a free isocyanate content of about 1.8 percent (theoretical, 1.9 percent) and an average molecular weight approximating 6,500.

The product then is diluted with xylene to provide a leather treating composition containing about 35 percent product.

*Example 5*

Erythritol is polyoxypropylenated by treatment with propylene oxide to provide a polyoxypropylenated erythritol of an average molecular weight of 2,650. Then 265 parts of this polyoxypropylenated erythritol are slowly added to a constantly agitated mixture of 73 parts of 2,4-tolylene diisocyanate and 0.3 part of dibutyltin dilaurate, which mixture is under an atmosphere of dry nitrogen. The resulting mixture, while still under an atmosphere of dry nitrogen and with constant agitation thereof, is heated to and held at about 90° C. for about 30 minutes, and then cooled to about 20° C. The resulting substituted-amine product is of a free isocyanate content of 4.9 percent (theoretical, 5.0 percent) and an average molecular weight of about 3,350.

A composition containing 35 percent of the substituted-amine product in ethyl toluene then is prepared for treatment of leather.

*Example 6*

Sorbitol is polyoxyethylenated by treatment with ethylene oxide to provide a polyoxyethylenated sorbitol of an average molecular weight of 19,000. Then 950 parts of this polyoxyethylenated sorbitol are slowly added to a constantly agitated mixture of 54 parts of 2,4-tolylene diisocyanate and 0.8 part of dibutyltin dilaurate, which mixture is under an atmosphere of dry nitrogen. The resulting mixture, while still under an atmosphere of dry nitrogen and with constant agitation thereof, is heated to and held at 90° C. for about 30 minutes, and then cooled to about 20° C. The resulting substituted-amine product is of a free isocyanate content of 0.8 percent (theoretical, 0.8 percent) and an average molecular weight of about 20,050.

A composition containing 25 percent of the substituted-amine product in toluene then is prepared for treatment of leather.

*Example 7*

In substantial accordance with the procedure of Example 6, a polyoxypropylenated sorbitol of an average molecular weight of 14,100 is reacted with o-phenylene diisocyanate in the ratio of about 6 moles of the diisocyanate to each mole of the polyoxypropylenated sorbitol by heating a mixture thereof to about 40 minutes while under an atmosphere of dry nitrogen and with constant agitation to yield a substituted-amine product having a free isocyanate content of about 1.6 percent (theoretical, 1.7 percent) and an average molecular weight approximating 15,050.

A composition of 35 percent of the substituted-amine product in ethyl toluene then is prepared for treatment of leather.

*Example 8*

To 55 parts of hexamethylene diisocyanate under an atmosphere of dry nitrogen and under constant agitation, there are added 210 parts of a polyoxypropylenated trimethylolpropane of an average molecular weight of 2,100. The mixture is diluted with a 1:1 mixture of betaethoxyethyl acetate having the formula

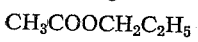
$$CH_3COOCH_2C_2H_5$$

and toluene and reacted at 85° C. for about 40 minutes. The resulting substituted-amine product, dissolved in the betaethoxyethyl acetate-toluene mixture, then is diluted further with additional 1:1 mixture of betaethoxyethyl acetate and toluene to provide a leather treating composition containing about 30 percent substituted-amine product.

*Example 9*

To 115 parts of 2,4-tolylene diisocyanate under an atmosphere of dry nitrogen and under constant agitation, were slowly added 225 parts of polypropylene glycol of an average molecular weight of 750. The mixture was heated 1 hour at 100° C. Then 0.57 part of orthochlorobenzoyl chloride was added followed by 157.5 parts of a trihydroxyl polyoxypropylene having a hydroxyl number of 148.5 to 181.5 and an average molecular weight of 1,030. This final mixture was reacted at 100° C. for 1 hour and diluted with a 1:1 mixture of betaethoxyethyl acetate and toluene.

*Example 10*

To 76.5 parts of an isomeric mixture of 2,4- and 2,6-tolylene diisocyanate under an atmosphere of dry nitrogen and under constant agitation was added a mixture of polyoxypropylenes containing 102.5 parts of polypropylene glycol with an average molecular weight of 1,025 and 202.5 parts of polypropylene glycol with an average molecular weight of 2,025 dissolved in 127.3 parts of anhydrous betaethoxyethyl acetate. The reaction mixture was heated to 100° C. and maintained at this temperature for 1½ hours. Orthochlorobenzoyl chloride, 0.4 part, was added; then 68.6 parts of a trihydroxy polyoxypropylene of an average molecular weight of 1,000 was added slowly to the mixture, and the reaction mixture was heated to 100° C. for 2 hours, cooled and diluted with betaethoxyethyl acetate to 35 percent solids.

*Example 11*

To 76 parts of 2,4-tolylene diisocyanate under an atmosphere of dry nitrogen and under constant agitation, 200 parts of polybutylene glycol of an average molecular weight of 1,000 was slowly added and heated at 55° C. for 1½ hours. A mixture of ethyl acetate and betaethoxyethyl acetate was used to reduce viscosity, then 23.1 parts of a trihydroxy polyoxypropylene with an average molecular weight of 700 was added slowly and reacted at 55° C. for 1½ hours. The mixture was then diluted further with a 1:1 mixture of ethyl acetate and betaethoxyethyl acetate.

*Example 12*

To 76 parts of 2,4-tolylene diisocyanate under an atmosphere of dry nitrogen and under constant agitation, 200 parts of polybutylene glycol of an average molecular weight of 1000 was slowly added and the reaction mixture heated at 55° C. for 1½ hours. A mixture of ethyl acetate and betaethoxyethyl acetate was used to reduce viscosity then anhydrous castor oil, 32.2 parts, was added slowly and reacted at 55° C. for 1½ hours. The mixture was then diluted further with a 1:1 mixture of ethyl acetate and betaethoxyethyl acetate.

*Example 13*

To 139.2 parts of 2,4-tolylene diisocyanate and 0.35 part of parachlorobenzoyl chloride under an atmosphere of dry nitrogen and under constant agitation, polyethylene glycol, 240 parts, of an average molecular weight of 600 was added. The mixture was reacted for 1½ hours at 60° C., then 195.1 parts of anhydrous castor oil was added and reacted for 1½ hours at 55° C. Ethyl acetate, 574.3 parts, was added during the reaction to reduce viscosity.

*Example 14*

To 50.4 parts of hexamethylene diisocyanate under an atmosphere of dry nitrogen and under constant agitation, polyethylene glycol, 20 parts, of an average molecular weight of 400, dissolved in 70.4 parts of n-butylacetate was added and reacted for 1 hour at 50° C. Then, 97.5 parts of an anhydrous castor oil in 97.5 parts of normal butylacetate were added and the mixture reacted for an additional 1 hour at 50° C.

*Example 15*

To 47.9 parts of an isomeric mixture of 2,4- and 2,6-tolylene diisocyanate under an atmosphere of dry nitrogen and under constant agitation, 253.1 parts of polypropylene glycol with an average molecular weight of 2,025 were added slowly with 99.3 parts of betaethoxyethyl acetate. The mixture was heated and reacted at 100° C. for 2 hours, then cooled. To this intermediate reaction product was added 23.9 parts of a hexahydroxy compound based on sorbitol with polyoxypropylene chains terminated with hydroxyl groups and this final mixture was reacted for 2½ hours at 100° C. Additional betaethoxyethyl acetate was then added to yield a solution of approximately 35 percent solids.

*Example 16*

To 191.4 parts of 2,4-tolylene diisocyanate under an atmosphere of dry nitrogen and under constant agitation, polypropylene glycol, 1000 parts, with an average molecular weight of 2000 was added slowly. The mixture was heated at 100° C. for 2 hours and then cooled. Then 204 parts of a tetrahydroxy compound formed by the sequential addition of propylene and ethylene oxides to propylene glycol and having an average molecular weight of 1,360 were added slowly to the intermediate reaction product and reacted for 2½ hours at 100° C. A 1:1 mixture of betaethoxyethyl acetate and toluene was then added to yield a leather treating solution of 30 percent solids.

*Example 17*

In the preceding examples wherever a diisocyanate is used as one of the reactants, a diisothiocyanate can be substituted without effecting any appreciable change in the procedure followed in the preparation of the desired modified isothiocyanate compound.

*Example 18*

In place of 76.5 parts of the isomeric mixture of 2,4- and 2,6-tolylene diisocyanate used in Example 10, 84.5 parts of p-phenylene diisothiocyanate were employed. The other reactants and conditions used to form the final reaction product were identical to those given in Example 10. A modified diisothiocyanate product resulted.

*Example 19*

Hexamethylene diisothiocyanate, 88 parts, was used in place of the isomeric mixture of 2,4- and 2,6-tolylene diisocyanate cited in Example 10. The other reactants and conditions used to form the final reaction product were identical to those given in Example 10. A modified diisothiocyanate product resulted.

*Example 20*

Example 10 was repeated, except that an inorganic diisocyanate, sulfodiisocyanate, 58.1 parts, was used in place of the isomeric mixture of 2,4 and 2,6-tolylene diisocyanate. A modified diisocyanate product was obtained.

*Example 21*

A chrome-tanned, vegetable-mordanted, corrected grain cowhide shoe-upper leather is treated in the dry, crusted state by spraying with the substituted-amine composition of Example 1. The treated leather is dried, cured, and then finished as normal leather. The finished leather shows a significant improvement in both finish and leather break and about a 40 percent improvement in finish scuff resistance as determined by the "International Scuff Tester."

*Example 22*

The substituted-amine compositions of Examples 2 and 3 are applied by roller to chrome-tanned, mill-dyed, corrected-grain cowhide leathers. The leathers are dried and then finished. After finishing, these leathers show significant improvement over other finished leathers in break properties, and in scuff and abrasion resistance.

*Example 23*

The susbtituted-amine compositions of Examples 6, 7, and 8 are applied by swabbing to vegetable-tanned, full-grain, case leathers. These leathers then are dried and finished. After finishing, these leathers show significant improvement in break properties, and in scuff and abrasion resistance.

*Example 24*

A chrome-tanned, mill dyed, full-grain cowhide shoe-upper leather in the dry, crusted state was first covered with a light sealer coat containing 3 to 4 percent acrylic type resin, and dried. Then the modified isocyanate composition in Example 10 was applied by spray as a 35 percent solution in betaethoxyethyl acetate to deposit 3 to 4 grams solids per square foot of leather. The treated leather was dried, cured, and then finished as normal leather. The finished leather showed a significant improvement in both finish and leather break and a 100 to 200 percent improvement in finish scuff resistance as determined by the "International Scuff Tester."

*Example 25*

A chrome-tanned, vegetable-retanned, corrected-grain cowhide shoe-upper leather was treated in the crusted state by swabbing with a 20 percent solution of the modified isocyanate composition prepared from tolylene diisocyanate, polypropylene glycols having molecular weights of 1,025 and 2,025 and a trihydroxy polyoxypropylene. This leather after finishing shows significant improvement over other finished leathers in break properties and in scuff and abrasion resistance.

*Example 26*

The modified isocyanate composition prepared in Example 10 can be applied by roller to vegetable-tanned, corrected-grain case leather. The leather is then dried. After finishing, the leather shows significant improvement in break properties, and in scuff and abrasion resistance over other leather.

*Example 27*

The modified isocyanate composition of Example 14 can be applied by spraying to the grain side of vegetable-tanned, corrected-grain case leather. The leather is dried. After finishing, the leather shows significant improvement in break properties and in scuff and abrasion resistance.

*Example 28*

When the grain side of leather is impregnated with a modified diisothiocyanate composition prepared in accordance with the procedure described above, the surface properties of the leather would be enhanced in the same manner as when the grain side of the leather is impregnated with a modified diisocyanate composition.

*Example 29*

The modified isocyanate composition prepared in Example 20 was applied to the grain side of leather. The leather was then dried. After finishing, the leather showed significant improvement in its break properties as well as in scuff and abrasion resistance.

It is to be understood that changes and variations may be made without departing from the spirit and scope of the invention as defined in the apended claims.

What is claimed is:

1. A process for treating crusted leather comprising the step of:
   (a) applying to the grain side of the leather and penetrating into the leather a treating composition consisting essentially of a substituted-amine product of a molecular weight in the range of 2,300 to 20,500, said substituted-amine product being of a structure terminated solely by —NCY terminal groups and further structurally having a polyvalent radical of carbon, hydrogen and oxygen atoms with all oxygen atoms in the polyvalent radical present as polyoxyalkylene ether linkages, the polyvalent radical having at least three valencies with each valence satisfied by a single substituted-amine group connecting directly to a divalent organic radical having a valence satisfied by one of the radicals —NCY as a terminal group, the substituted-amine group being selected from the group consisting of carbamate and thiocarbamate radicals, said divalent organic radical being selected from the group consisting of alkylene, arylene, and alkarylene radicals, and Y being an atom selected from the group consisting of oxygen and sulfur.

2. A process for treating crusted leather comprising the steps of:
(a) applying to the grain side of the leather and penetrating into the leather a treating composition consisting essentially of a substituted-amine product in a diluent solvent and said product being defined by the formula

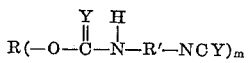

where R is a polyvalent radical of carbon, hydrogen and oxygen with all oxygen atoms in the polyvalent radical present as polyoxyalkylene ether linkages, R′ is a divalent organic radical selected from the group consisting of alkylene, arylene, and alkarylene radicals, Y an atom selected from the group consisting of oxygen and sulfur, m an integer of at least three, and the substituted-amine product is of a molecular weight in the range of 2,300 to 20,500; and (b) driving off the diluent-solvent by heating.

3. The process of claim 2 in which said diluent-solvent contains from 20 to 50 percent by weight of the substituted-amine product.

4. A process for treating crusted leather comprising the step of:
(a) applying to the grain side of the leather and penetrating into the leather a treating composition consisting essentially of a substituted-amine product defined by the formula

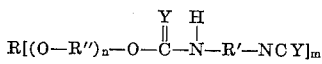

where R is a polyvalent hydrocarbon radical, R″ a divalent organic radical selected from the group consisting of ethylene, propylene, and butylene radicals, R′ a divalent organic radical selected from the group consisting of alkylene, arylene, and alkarylene radicals, Y an atom selected from the group consisting of oxygen and sulfur, m an integer of at least three, n an integer, and m, n, R, and R′ are such as to provide a molecular weight in the range of 2,300 to 20,500 for the substituted-amine product.

5. A process for treating crusted leather comprising the step of:
(a) applying to the grain side of the leather and penetrating into the leather a treating composition consisting essentially of a substituted-amine product of the formula

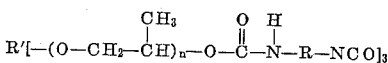

where R′ denotes the glyceryl radical, R denotes the tolylene radical, and n is a number providing a molecular weight in the range of 2,300 to 20,500 for the substituted-amine product.

6. A process for treating crusted leather comprising the step of:
(a) applying to the grain side of the leather and penetrating into the leather a treating composition consisting essentially of a substituted-amine product of the formula

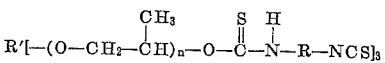

where R′ denotes the glyceryl radical, R denotes the tolylene radical, and n is a number providing a molecular weight in the range of 2,300 to 20,500 for the substituted-amine product.

7. The treated leather product resulting from the process of claim 1.

References Cited by the Examiner
UNITED STATES PATENTS

| | | | |
|---|---|---|---|
| 2,284,896 | 6/1942 | Hanford | 260—77.5 |
| 2,292,443 | 8/1942 | Hanford | 260—77.5 |
| 2,468,716 | 4/1949 | Nyquist | 8—28.5 |
| 2,577,279 | 12/1951 | Simon | 260—2.5 |
| 2,577,280 | 12/1951 | Simon | 260—2.5 |
| 2,948,691 | 8/1960 | Windemuth. | |
| 2,983,566 | 5/1961 | Kremen | 8—94.21 |
| 2,998,294 | 8/1961 | Locke | 9—94.21 |
| 3,066,997 | 12/1962 | Neher et al. | 8—94.21 |

FOREIGN PATENTS

| | | |
|---|---|---|
| 566,206 | 9/1958 | Belgium. |
| 815,185 | 6/1959 | Great Britain. |

OTHER REFERENCES

Chem. Abst., vol. 48, 1954, 11,834.

Heiss et al., Ind. & Chem., vol. 42, July 1954, pages 1498–1503.

NORMAN G. TORCHIN, *Primary Examiner.*

ABRAHAM H. WINKELSTEIN, *Examiner.*

D. LEVY, *Assistant Examiner.*